United States Patent Office 2,968,505
Patented Jan. 17, 1961

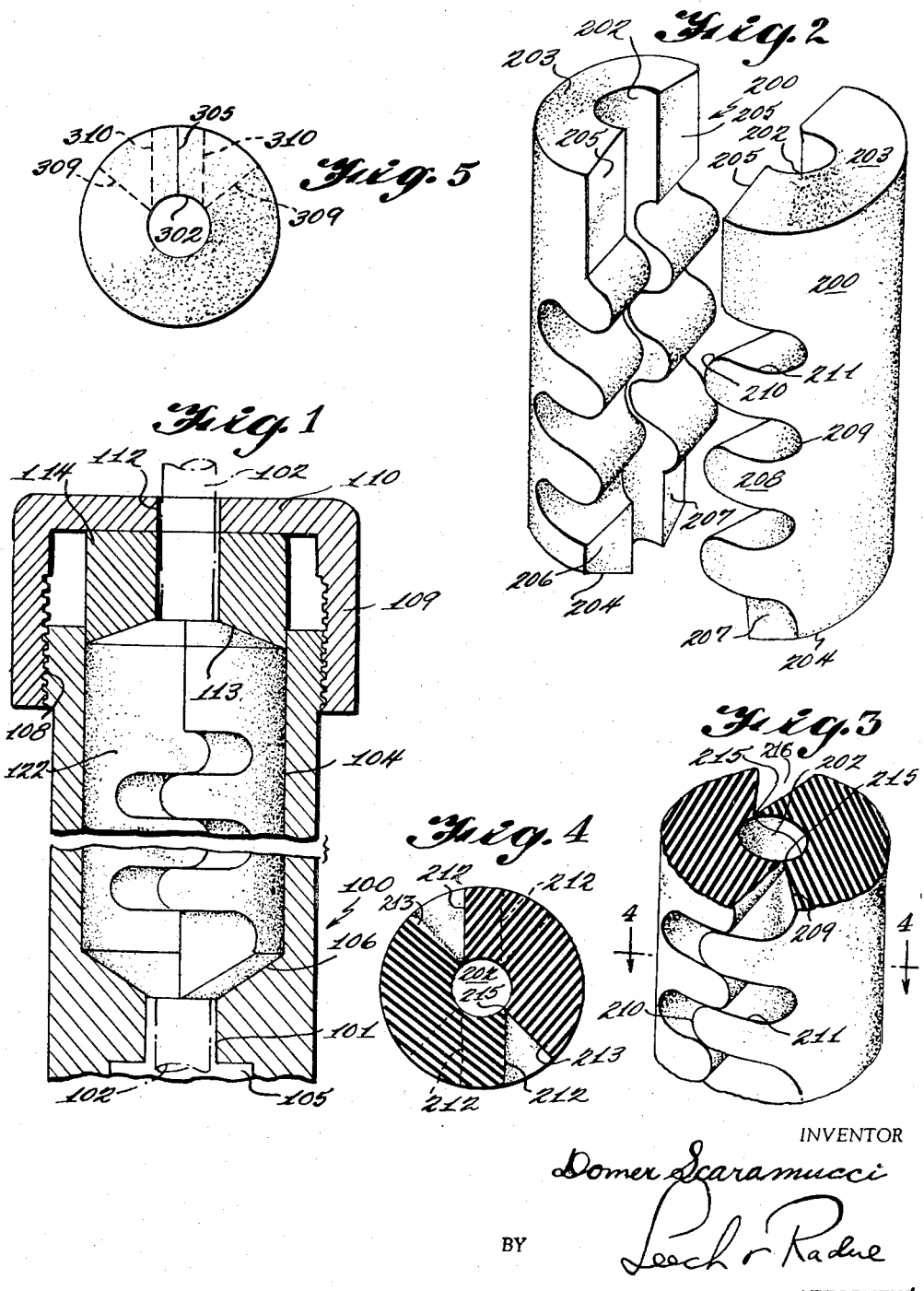

2,968,505

LONG LIFE CYLINDRICAL PACKING FOR OIL SAVERS AND LIKE DEVICES

Domer Scaramucci, P.O. Box 4446, Oklahoma City, Okla.

Original application May 3, 1957, Ser. No. 656,784. Divided and this application Mar. 24, 1958, Ser. No. 723,332

8 Claims. (Cl. 288—13)

This invention relates to long life cylindrical packing for use with wire line oil savers, wire line wipers or strippers, sand line oil savers, pump stuffing boxes and like uses for service, basically in oil field operations, when installed in an appropriate housing mounted on the tubing at the head of an oil or gas well, at such times when pumping, swabbing and/or cleanout operations are being performed where the packing acts to wipe, strip and pack off fluid and/or gas during the running of wire lines carrying cleanout tools or reciprocation of piston or pumping rods and the like. The unique packing is however capable of much wider general usage than that indicated.

The packing of the present invention is of the so-called "cylindrical type" for use in a normally cylindrical housing having a bore of such size, between line guides or bushings, as to accommodate it and being equipped with an appropriate follower and thrust means to compress the packing longitudinally and cause it to expand radially inwardly to engage the wire or connecting rod and act similarly, but throughout a much longer period, to the conventional stuffing box-packing arrangements in piston pumps and the like.

In accordance with the present invention the packing, formed in either one or two parts, is arranged so that it may be opened or separated to be fitted over an intermediate portion of a wire line, polish rod, or the like and has interlocking fingers along a sinuous line of severance, each provided with clearance at the ends except immediately adjacent the central bore, so that material worn from the walls of this bore may be compensated for by compression of the packing, causing its eventual movement radially inwardly and somewhat corcumferentially to further interlock the fingers and maintain this line of contact at the bore surface over a long period of wear without the usual difficulty of excess material interfering with the compression and wire contact.

It is thus a general object of the present invention to provide a novel and improved cylindrical packing of long life for oil savers and like devices.

More particularly it is an object of the invention to construct the packing of generally cylindrical form, centrally bored for wire line passage and split for application over the line, the meeting edges of the split being fitted with interleaved fingers, the ends of which engage the bottoms of the slots, between adjacent fingers on the facing edge, only at the surface of the bore and diverge therefrom to the outer surface of the packing, whereby wear at the hole surface may be compensated for by substantially radial compression of the material of the packing without interference or distortion such as would be caused by lack of interfitting fingers and absence of the space provided by such divergence, thus contributing materially to longer life and accurate functioning of the packing.

Other and further objects and features of the invention will be more apparent to those skilled in the art upon a consideration of the accompanying drawing and following specification wherein are disclosed several exemplary embodiments of the cylindrical packing for oil savers, with the understanding that such changes and modifications may be made therein as fall within the scope of the appended claims without departing from the spirit of the invention.

In said drawing:

Figure 1 is a longitudinal central section through a simple stuffing-box type of oil saver or the like fitted with a long life cylindrical packing constructed in accordance with the present invention;

Figure 2 is an exploded, perspective view of the unique packing in the two part form;

Figure 3 is a truncated, perspective view of the packing elements of Figure 2 assembled for use;

Figure 4 is a transverse section taken on line 4—4 of Figure 3; and

Figure 5 is a plan view of a modification in which the packing is all in one piece, split along a single joint, but using the same type of interlocking fingers shown in Figure 2.

This application is a division of my copending application Serial No. 656,784, filed May 3, 1957 entitled "Wire Line Oil Saver for use with Cylindrical Packing and Packing Therefor."

Many times during the drilling of an oil or gas well, and subsequently during its producing life, it becomes necessary or desirable to introduce into the drill tubing, or into the casing various types of tools, cleanout devices, measuring or recording instruments and the like, and to lower them on a wire line or cable, and often times such cable may be thousands of feet long. It is highly desirable under many circumstances to be able to seal off the well casing or tubing about the cable, first, when lowering it so as to prevent the escape of gas or liquids under pressure from the well, and second when withdrawing the cable, at which time not only is pressure in the well maintained, but the wire line is automatically wiped clean of oil and other accumulations thereon which may either be allowed to fall back into the tubing or may be withdrawn through appropriate lateral discharge valves arranged for the purpose.

The packing illustrated in the drawing accompanying this application is intended to be mounted in an appropriate housing such as the one illustrated in Figure 1 or one of the more complex varieties such as that disclosed in the above identified application. Such housing is commonly associated with the top of an oil well tubing or casing string and therewith acts to seal off the upper end thereof. The housing is provided with suitable guide or bushings for the wire line, with the compressible packing and wiping material of the present invention forming a gas tight but slideable fit with the surface of the wire line, pump-rod, piston-rod or the like, between the bushings, for the purposes previously mentioned.

Reference should now be had to Figure 1 of the drawing for an understanding of the packing and its use, for instance at the head of an oil well casing or tubing for wiping a line, such as indicated at 102, which may be fitted with cleaning tools or other equipment for working on the walls of the well casing or at lower portions of the bore for various purposes, it being desired to seal off gas or oil under pressure at the head of the casing and to wipe the line 102 clean, when it is withdrawn, so as to protect the platform of the derrick against the accumulation of slippery substances. The stuffing box illustrated is merely an extremely simple form of housing to hold and compress the packing of the present invention and is arranged to be attached to the head of the well casing or tubing, or mounted in other appropriate positions and places to carry out the intended use of the packing. It is conveniently provided with a cylindrical housing 100 having a restricted bore 101, which may or may not be fitted with a bushing, to closely guide the wire line as it emerges from the tubing to prevent whipping. If bushed preferably the bushing is non-ferrous to prevent sparking. Below the restricted bore 101 the housing opens out to a large bore 105 and above it to the still larger bore 104 having a diameter adapted to receive and closely engage the walls of a new packing 122. Below bore 105 the housing may be fitting with means (not shown) to mount it in a fluid-tight manner on the tubing or casing head.

The upper surface of the web between the bore 105 and the larger diameter bore 104 is given an inverted conical configuration as shown at 106 for a purpose to be later defined and adapted to conform to a similar configuration at the lower end of the resilient, cylindrical packing 122 in bore 104.

The upper outer surface of shell 100 is threaded as at 108 to receive a simple, internally threaded cap 109 having an end closure 110 centrally bored as at 112, to guide the wire line, piston-rod or the like 102.

In this construction, the upper end of the packing is also truncated conical in shape as shown at 113, and is received in a correspondingly shaped recess at the lower end of the slidable metal bushing 114, whose flat upper end bears against the inner face of closure 110 or cap 109. By rotating the cap in respect to the shell the thrust bushing 114 may be pressed down longitudinally on the upper surface of the packing and provide for radially inward pressure thereon at both the upper and lower ends thereof because of the conical construction, thereby improving the wiping facilities and the ability to take up and adjust for wear.

The first embodiment of the invention is shown in detail in Figures 2, 3 and 4 and in this preferred form two half sections 200 are illustrated which are identical in form so that when in positions to face each other, as shown in Figure 2, they may properly cooperate and interfit. Each of the parts 200 may be considered essentially as a half cylindrical annulus, each section having a half cylindrical longitudinal bore 202 appropriately diametered to receive and engage the surface of the wire line or other sliding element with which it is intended to be used. The upper ends of the sections are shown flat in this Figure and at right angles to the axis of the bore 202 as indicated at 203, while the lower ends are tapered conically as seen at 204 to cooperate with the taper 106 in the lower end of the oil saver. At their upper ends the sections 200 are semi-cylindrical, as shown, having plane, diametrical faces 205 which engage, and compliment each other to form a cylindrical section at the upper portion of the packing. At the lower end the face 206 of each section is in the same plane as the face 205 directly above it, but the face 207 on the opposite side of the center is cut back so that the angle included between 206 and 207 is from 10 to 15 degrees less than 180 degrees. The corresponding cutaway in the other section is shown in the section at the lower right. With this arrangement, when the two sections are mated there will be diametrically opposite sector-like voids at the bottom, their sides merging to engagement at the surface of the cylindrical bore 202.

Between the upper and lower parti-cylindrical portions just defined, each of the half sections of the packing, at opposite sides of the central aperture or bore, is provided with alternate fingers 208 and separating notches 209, these fingers having parallel side walls 211 normal to the bore axis, and semi-cylindrical tips 210 joining them. All of the fingers on both sides of the bore on any one section have their tips lying in the same plane, shown at 212 in Figure 4, which is substantially tangent to the remote surface of the central bore 202. On the other hand, the bottoms of the recesses 209 on each side of either one of the sections lie in the same radial plane 213, but the planes 213 for each half 200 are only of the order of 90° apart, as seen in Figure 4. Thus there is a tight meeting of the interfitted tips of the fingers and the recess bottoms only at the surface of the bore 202, as clearly seen at 215 in Figures 3 and 4 whereby the surface of the bore is substantially intact and any fluid wiped from the wire line thereby will not be able to pass out through the sector-shaped openings between the tips of the fingers and the bottoms of the recesses since these are closed at the circumference of the bore. Should there be any seepage through these openings, the tight engagement of the tops 203 of the packing sections with the appropriately shaped follower, as well as the tight engagement of the full half sections at the top of the packing with the side walls of the chamber in which they are fitted, ensures against fluids being able to remain on or gain access to the surface of the wire line prior to its emergence from the top of the packing chamber, whereby it may be said to be wiped and retained clean and dry as is desired.

As previously mentioned, when the two packing sections are engaged about the wire line in the form of a thick walled tube, the inner engaging edges of the fingers contact the walls of the voids at and near the wire line circle, and this condition remains substantially unaltered as wear occurs in the wire line bore. This wear cuts away the engaging portions at the tips of the sector-shaped recesses between the planes 212 and 213, as viewed in Figure 4, which recesses form the voids 216 best seen in Figure 3, which permits the fingers to continue to wrap or encircle about the line to maintain sealing contact. This wrapping is achieved by longitudinal pressure on the top of the packing sections, converted into radially inward pressure, as a result of longitudinal compression and the action of the interfitting conical bottoms and the surface 106. Since rubber-like materials of which the packing is made are deformable but not truly compressible i.e. their volume cannot be changed substantially, a reduction in length by longitudinal pressure, due to tightening the cap 109, expands the rubber-like materials radially and circumferentially, which produces the wrap around to maintain the inner tips of the fingers against the walls of the voids adjacent the wire bore however much wear, within reason occurs.

In operation, when installed in a suitable housing, as shown in Figure 1, initial engagement with the surface of the wire line is secured by screwing down the cap and forcing the packing to enter the lower cone 106. It is clearly proven that only the slightest compression is required to obtain very effective wiping, sealing and pressure pack-off when oil or gas pressure is encountered during line operation. This is due to the relieved areas 216 permitting free and relaxed inward movement of the fingers as pressure forms below. Fluid cannot pass through the voids from the line bore, however, for as the packing bore wears the fingers continue in the wrap around motion to hug the line. Although the outside packing diameter below the solid end sections tends to decrease, possibly permitting fluid to travel up along the outside of the packing, these solid top sections act as a secondary packing-to-housing seal and prevent its emergence from the housing.

The top sections being solid resist distortion and transmit thrust downwardly to the more yieldable relieved members which act as seals against the line while the top sections maintain sealing contact with the walls at the top of the housing. Line wear is less due to the control of whipping by the bore of follower 114 and hence there is not much enlargement at the top section of the bore although what does occur does not impair the sealing characteristics of the packing members since the fingered sections exclude fluid from entering into the line bore. Thus, damaging stress conditions to the sealing material are avoided in this new design and slow even wear is realized until the voids are filled and the rubber assumes the status of a solid pack at which point it should be replaced.

Obviously minor modifications may be made in the cylindrical packing devices shown generally in Figure 2. Such changes might include flats on one or both ends; conical on one or both ends and with the same or different inclinations; fingers and voids odd or even in number, on one or on both sides of each section; split through on both sides for full two-piece construction as shown in Figure 2 or split on one side only for one-piece design as illustrated in Figure 5. The ends 210 of the fingers and the bottoms 209 of the notches need not be semi-cylindrical as long as they have mating surfaces.

This last figure is merely the end elevation of a one-piece packing construction. In this construction the arrangement can best be visualized by assuming that the two pieces illustrated in Figure 4 have been joined together along one side leaving only one set of interlocking fingers and voids on the opposite. Thus at the top of the packing the separation will be along the radial line 305 leading from the bore 302 to the outer circumference. Each dotted line 310 represents the tips of one set of the fingers, or looked at another way the upper edge of the plane representing the terminus of these tips, while each dotted line 309 assumes a corresponding position in respect to the bottoms of the voids. With this construction in order to assemble the packing over the wire line or pump piston-rod or the like, it must be forced open with the fingers or a suitable instrument and spread around the wire or rod and allowed to return to the condition illustrated.

As previously pointed out, any of the several embodiments is capable of being used either in the line wiper assembly of Figure 1, in a simple stuffing box arrangement, or in any one of a number of well-known commercial devices having an appropriate cylindrical bore to receive it, and is capable therein of performing in a manner much superior to the conventional packing element in one piece longitudinally split on one side or containing two half cylindrical sections separated along a diametrical plane which arrangements provide an excess of material which cannot be usefully worn as the bore enlarges because of the inability to actually compress or reduce the total volume of rubber or like materials. The useful life of such solid packings is very short compared with that of the simple type illustrated in applicant's drawings.

Having thus described my invention, what I claim as novel and desire to secure by Letters Patent of the United States is:

1. A packing for wire lines, polish rods and the like comprising a thick walled circular tube of elastomer having a bluntly pointed end, a circular axial bore sized to closely receive a wire line or the like, the wall of said tube having a generally longitudinal separation from end to end whereby it may be applied to or removed from a wire etc. without threading thereover, said separation adjacent one end being a longitudinal cut through the tube wall in a plane substantially axial to the bore, each edge of the separation of the intermediate portion of the tube wall having axially spaced fingers projecting circumferentially therefrom, each finger having flat side walls lying in parallel planes normal to the bore axis and a connecting tip, said fingers being spaced apart axially of the packing a distance substantially that of their own axial lengths and disposed on each edge of the separation opposite the spaces similarly formed by finger spacing on the other edge for close interfitting, the finger tips and space bottoms on each separation edge being substantially aligned in separate planes substantially radiating from said axis and angularly displaced to provide sector-like voids between the tips of the fingers and the space bottoms on each separation edge, said voids being tightly closed at the bore surface.

2. The packing as defined in claim 1 in which the block of elastomer is composed of two independent portions, each having two edges configured as defined for interlocking about a wire or the like.

3. The packing as defined in claim 2 in which the two portions are alike to permit forming in the same mold.

4. A packing member adapted to be confined within a cylindrical bore and be compressed longitudinally while positioned on a slidable cylindrical member; said packing member comprising a tubular cylindrical structure closely enclosing the cylindrical member and fitting within the cylindrical bore, the wall of said cylindrical structure being split longitudinally along a sinuous path defined on each edge by at least one straight end portion extending substantially radially through the wall and continuing in a sinuous surface extending alternately at opposite sides of the straight radial plane of the end split portions to define fingers and mating slots having flat parallel side walls, the ends of the fingers and the bottoms of the slots engaging each other for less than the thickness of the tubular wall.

5. The packing member as defined in claim 4 in which said finger ends and slot bottoms engage only adjacent the slidable cylindrical member and diverge outwardly therefrom whereby as wear results from the slidable member the packing member can be radially constricted to engage its surface without the need to greatly compress the material thereof.

6. The packing member as defined in claim 4 in which the cylindrical structure is split longitudinally along sinuous paths 180 degrees apart for complete separation into two parts.

7. The packing member as defined in claim 6 in which the said straight end portions have diametrically extending mating walls and the opposite end portions have radial walls spaced less than 180 degrees apart on each part.

8. The packing as defined in claim 4 in which the tubular cylindrical structure is divided into parts longitudinally along sinuous paths substantially diametrically opposed, each part being identical with the other and having each finger on one substantially radial wall laterally adjacent a slot in the other, there being an equal number of slots and fingers allotted to each radial wall.

References Cited in the file of this patent

UNITED STATES PATENTS

| | | |
|---|---|---|
| 1,011,671 | Thompson | Dec. 12, 1911 |
| 1,045,088 | Wriedt | Nov. 19, 1912 |
| 1,875,936 | Saunders | Sept. 6, 1932 |
| 2,160,292 | Scott | May 30, 1939 |
| 2,176,323 | Bowen et al. | Oct. 17, 1939 |
| 2,692,152 | Tremolada | Oct. 19, 1954 |